UNITED STATES PATENT OFFICE.

JAMES C. WENDREM, OF ALBANY, ASSIGNOR TO WHEELER, MELLICK & COMPANY, OF ALBANY, AND EDWD. WACKERHAGEN, OF GREENVILLE, NEW YORK.

IMPROVED COMPOSITION FOR PAINT.

Specification forming part of Letters Patent No. 49,201, dated August 1, 1865.

*To all whom it may concern:*

Be it known that I, JAMES C. WENDREM, of Albany, in the county of Albany and State of New York, have invented, made, and applied to use a certain new Improvement in Composition for Paint; and I do hereby declare the following to be a full, clear, and exact description of the same, and of the mode of employing it.

The object of my invention is to produce a composition that will resist the atmospheric action and moisture, that can be mixed with ordinary pigments, either dry or ground in oil, and render them of a consistency adapted to use with a brush, thus increasing the body of the paint, rendering it better adapted to the preservation of wood-work especially, and at the same time effecting a saving in the metallic pigments employed.

I take about four pounds of glue and dissolve it in about eighteen gallons of water, to which I add about four pounds of potash. I also prefer to add about one pound of sugar of lead and about one and a quarter pound of ammonia. The mixture is to remain about one day before being used, and is to be thoroughly stirred so as to mix the ingredients.

This compound, when mixed with any of the metallic or other pigments, either dry or ground in oil, in the usual manner, will combine with them and form a paint possessing great durability and having a glossy surface and sufficient body to fill the pores of wood-work. The color of the pigment is not injured by this compound, and less of said pigment will be required to produce a perfectly painted surface than when the pigment is thinned out for use by means of turpentine, benzine, or other essential oils.

I have found that concentrated lye, soda-ash, caustic soda, or sal-soda may be employed wholly or partially in place of the potash aforesaid, and that when sal-soda is employed the compound will not become as thick as when the potash alone is used.

Pigments ground in oil are in some respects preferable for mixing with my aforesaid compound; but dry pigments may be either mixed or ground with such compound.

What I claim, and desire to secure by Letters Patent, is—

The composition specified, for mixing with pigments to form a paint.

In witness whereof I have hereunto set my signature this 24th day of April, 1865.

JAMES C. WENDREM.

Witnesses:
E. S. BEDELL,
W. B. DERBY.